United States Patent [19]

Glover

[11] Patent Number: 4,632,151

[45] Date of Patent: Dec. 30, 1986

[54] NON-RETURN VALVES

[75] Inventor: Brian H. Glover, Teddington, United Kingdom

[73] Assignee: Grundy (Teddington) Limited, Teddington, England

[21] Appl. No.: 649,602

[22] Filed: Sep. 12, 1984

[30] Foreign Application Priority Data

Sep. 15, 1983 [GB] United Kingdom ................ 8324763

[51] Int. Cl.$^4$ .............................................. F16K 15/14
[52] U.S. Cl. ..................................... 137/854; 137/843
[58] Field of Search ......................... 137/843, 854, 852

[56] References Cited

U.S. PATENT DOCUMENTS

| | | | |
|---|---|---|---|
| 3,403,696 | 10/1968 | Pynchen | 137/852 |
| 3,456,683 | 7/1969 | Roulet et al. | 137/843 |
| 3,648,728 | 3/1972 | Perry et al. | 137/854 |
| 4,222,407 | 9/1980 | Ruschke et al. | 137/843 |
| 4,428,392 | 1/1984 | Jones et al. | 137/854 |
| 4,550,749 | 11/1985 | Krikorian | 137/854 |

FOREIGN PATENT DOCUMENTS

| | | | |
|---|---|---|---|
| 106749 | 8/1979 | Japan | 137/854 |
| 2097102 | 10/1982 | United Kingdom | 137/852 |

Primary Examiner—Martin P. Schwadron
Assistant Examiner—S. Novack
Attorney, Agent, or Firm—Anthony A. O'Brien

[57] ABSTRACT

A non-return valve element comprises a one piece moulding of resilient rubber material, for example a synthetic rubber, which is shaped to include a relatively thick and hence rigid planar rib 1 of which the upper edge 1a includes a cylindrical protuberance 2 forming a reinforcement against longitudinal and transverse deflections. The lower edge 1b of the rib has two integral laterally extending wings 3 and 4, each of which is semi-circular in plan. The wings together in planform are circular and are designed to fit a cylindrical bore 5 provided in a fluid flow channel. The bore 5 is delimited from a narrower cross-section bore 6 by means of a shoulder 7 forming a seating for the wings 3 and 4, and an abutment for the ends 8 and 9 of the edge 1b of the rib 1. Fluid flow from channel 6 to 5 causes the wings to flex about the juncture lines 3a, 4a, with the rib and to facilitate this hinging action the line of the juncture is of reduced thickness, conveniently achieved by providing for the planar uppermost surface of the wing to taper relatively to the planar lower surface.

3 Claims, 3 Drawing Figures

NON-RETURN VALVES

This invention relates to non-return valves and in particular to a flexible valve element which may be installed in a fluid flow passageway to allow relatively unimpeded flow in one direction whilst preventing substantial flow in a reverse direction.

It is known from the prior art to provide flat plate-like valve elements which hinge along a centre line so as to open and close a passageway into which they are fitted. In U.S. Pat. No. 3,831,628 such a valve element is disclosed wherein the two wing portions are hingedly connected to a central rib by means of a resilient rubber plate. In this device the rubber plate merely forms an instrument about which hingeing is effected and in itself does not form the valve closure element. G.B. Pat. No. 796162 shows a similar arrangement wherein resiliency of the wings is provided by a rubber insert. Other prior art such as G.B. Pat. No. 2060830A and U.S. Pat. No. 3,965,926 show flap valve arrangements having rigid wings which are urged to a closed position by helical springs.

Such constructions of valve could not be used in installations for beverage dispensing principally because of the difficulty of sterilization and also problems associated with the construction which necessitates the element being made of a reasonably large size. It will be appreciated that any attempt to reduce the size significantly to adapt it to small bore tubing would result in considerable forces being necessary to open the valve and it would not therefore achieve the object.

An object of this invention is to provide a non-return valve element which has a small flow restricting cross section when opened and which is simple and of low cost and which can be installed and removed for replacement or cleaning easily.

A further object is to provide a valve which initially opens in the flow direction under very low pressures.

According to this invention there is provided a non-return valve assembly for fluid flow comprising a valve body member having a through bore with an intermediate stepped internal shoulder dividing said bore into two sections, a first section thereof being of smaller diameter than a second section thereof, the first section defining a fluid inlet and the second section defining a fluid outlet for forward fluid flow through said valve, a valve element positioned within said second section of the bore, the valve element comprising a flat rib portion lying transversely across a diameter of said second section of the bore and with a side of the rib in abutment with said stepped shoulder, said side of the rib having integral wings projecting laterally one from each side to define a circular planform with the periphery of the wings lying in abutment with the said stepped shoulder to close the bore, the wings being capable of flexure hinge-wise about a zone of reduced thickness adjacent the juncture between the wings and rib whereby, with fluid flow in a forward direction, the wings flex to lie adjacent said rib to open the bore.

The plane containing the wings preferably extends substantially at right angles to the plane of the rib.

Preferably, a taper transition is provided between the first and second sections of the through bore, the free cross-sectional area of the first section of the bore being substantially the same as the second section of the bore. That is to say, the cross-sectional area of the second section of the bore taking into account the reduction caused by the valve element inserted therein will be substantially the same as the cross-sectional area of the first portion of the bore.

In order to retain the valve element a collar threadably engages the second bore section, the collar engaging that side edge of the rib opposite to that abutting the stepped shoulder, the collar securing the valve element within said second section of the bore, the side edge of the rib engaged by the collar having a reinforcing protuberance along the length thereof.

Preferably the thickness of the wings forming the valve element tapers from a minimum at the juncture with the rib to a maximum at the outer extremity, the valve element comprising a one-piece moulding of a resilient rubber material.

In use, the wings of the valve element normally fill the bore and sealingly engage the stepped shoulder with the plane of the rib lying along the longitudinal axis of the bore. Fluid flow through the bore from the inlet direction causes the wings to be flexed to a position adjacent the rib thus opening the valve, flow in an opposed direction causing the wings to seat firmly on the stepped shoulder to prevent reverse flow.

The operation and construction and further features of a valve element according to the invention is described by way of an example shown in the accompanying drawings, wherein.

Figure 1:
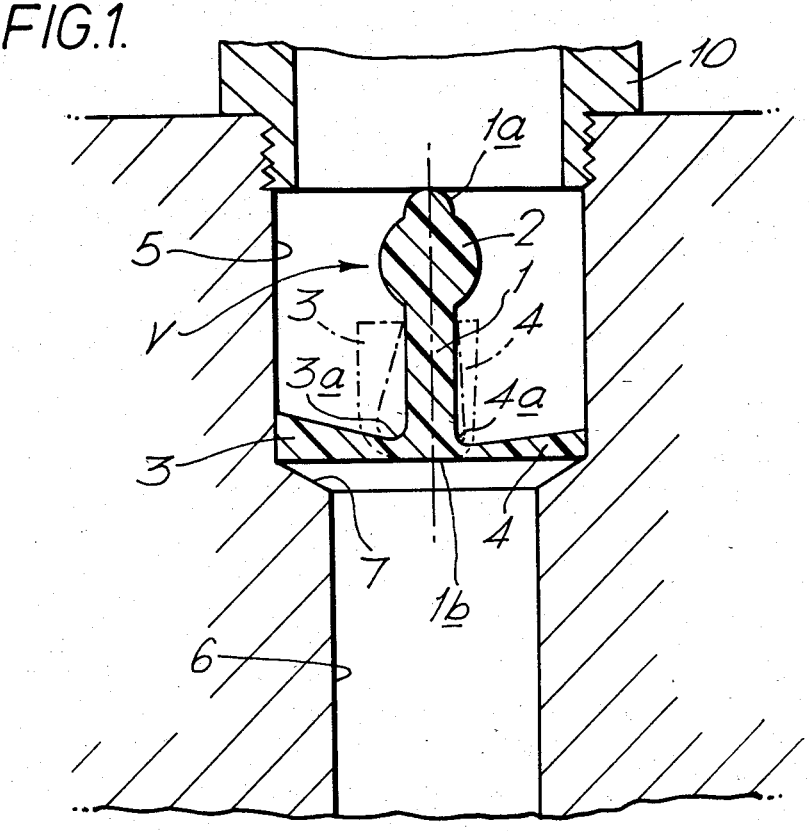
FIG. 1 shows a section through a valve element on X—X of FIG. 2, inserted in a bore.
Figure 2:
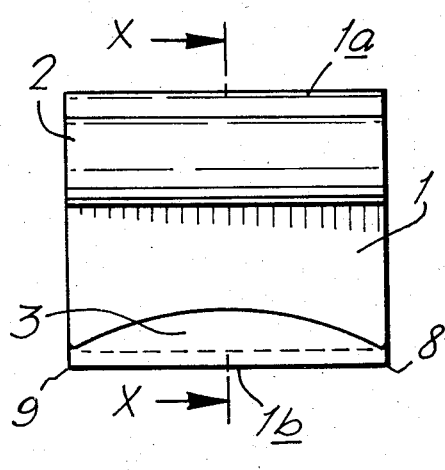
FIG. 2 shows a side view of a valve element.
Figure 3:
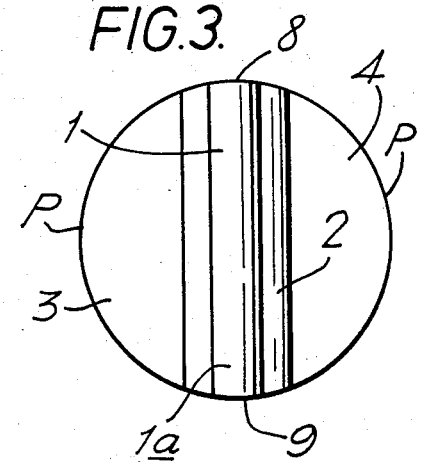
FIG. 3 shows a plan view of the valve element from above.

Referring to the drawings, the valve element V comprises a one piece moulding of resilient rubber material, for example a synthetic rubber, which is shaped to include a relatively thick and hence rigid planar rib 1 of which the upper edge 1a includes a cylindrical protuberance 2 forming a reinforcement against longitudinal and transverse deflections. The lower edge 1b of the rib has two integral laterally extending wings 3 and 4, each of which is semi-circular in plan and includes a periphery P. The wings together in planform are circular and are designed to fit a cylindrical bore or section 5 provided in a fluid flow channel. The bore 5 is delimited from a narrower cross-section bore or fluid inlet 6 by means of a shoulder 7 forming a seating for the wings 3 and 4, and an abutment for the ends 8 and 9 of the edge 1b of the rib 1. An anular securing collar 10 engages bore 5 and presses against the sides of the top edge 1a of the rib, thus causing same to be firmly clamped in position in bore 5.

Fluid flow from bore or channel 6 to the outlet bore 5 causes the wings to flex about the juncture lines 3a, 4a, with the rib and to facilitate this hinging action the line of the juncture is of reduced thrickness, conveniently achieved by providing for the planar uppermost surface of the wing to taper relatively to the planar lower surface. FIG. 1 shows two embodiments, the wing 3 of one embodiment being thicker than the wing 4 of the other. The juncture, in an alternative embodiment, has an arcuate depression extending parallel with the rib and forming a hinge line of reduced thickness. The wings are shown in broken lines in the position they adopt with maximum deflection. The thinner one of the two wings, i.e. 4, would be more suitable for lower operating pressures. The flowrate will be substantially the same for either wing shown as it is limited by the bore 6. The wings, in the embodiment, are tapered to provide a relatively wide hinge zone thus spreading the hinging stresses outwards. This avoids fatigue occuring along a single defined hinge line.

Return flow from one section or channel 5 to the other 6 causes the wings to be firmly seated on shoulder 7, thus creating a seal.

The rib 1 may be profiled to accomodate the wings in the open condition. This arrangement gives a high open flow cross-section in relation to size of bore and physical size and further the lightly inherently spring loaded wings are arranged so that the spring effect runs out of stroke at the point where the valve closes. This enables the valve to open at very low forward pressures. The one piece rubber moulding can be fitted into a simple stepped bore without the need for any precision finishing and the simple construction makes the non-return valve inherently hygienic, being easily sterilized. The valve can be fitted in any orientation as it does not rely on gravity to operate efficiently and can be moulded in various flexible materials to suit particular applications.

Although reference is made herein to the "hinge line" of the wings there is not, in practice, a definite line about which the wings pivot. The wings tend to "curl" about an area which can be made wider or narrower by adjusting the thicknesses at the juncture between wings and rib. Thus the wings will tend to curl when opening so as to avoid a definite hinge line and hence obviate local stresses occurring.

A further feature is that the valve can seat on a shoulder which is angled to say 30° to the bore section, thereby improving the flow pattern of the arrangement. This angled seating also improves the effectiveness of the sealing of the valve, since the valve has only line contact with the seat at low reverse pressures and consequently the sealing pressure along the line is high. As the reverse pressure is increased, the valve distorts and the contact line becomes wider and wider. This gives a more constant sealing pressure over a wide range of pressures.

As may be appreciated from the foregoing the present construction provides a novel construction of valve element specifically designed for the purposes herein set forth which purposes could not be achieved by the known prior art constructions. For the purposes envisaged herein the valve of this invention achieves all the required objects and has much simplified construction.

I claim:

1. A non-return valve assembly for fluid flow comprising a valve body member having a through bore with an intermediate internal shoulder dividing said bore into axially spaced-apart first and second sections, said first section defining a fluid inlet and said second section defining a fluid outlet for forward fluid flow through said valve, a valve element comprising a one-piece moulding of a risilient rubber material positioned within said second section of the bore, said valve element including a substantially flat elongate rib lying transversely across a diameter of said second section of the bore and extending along the longitudinal axis thereof, said rib having upper and lower edges, said lower edge of said rib in abutment with said shoulder, a collar threadably engaging said second bore section and abutting said upper edge of said rib at a position axially opposed to said lower edge of said rib abutting said shoulder, said collar captively securing the one-piece valve element within said second section of the bore to retain said rib against axial and transverse deflection, a reinforcing protuberance extending along said rib adjacent said upper edge, said lower edge of the rib having self-supporting integral wings projecting laterally one from each side to define a circular planform, said wings having a periphery normally lying in abutment with said shoulder to close with bore, and said wings each having a zone of reduced thickness adjacent the juncture between the wings and rib whereby, with fluid flow in a direction from said first section to said second section said wings flex hingewise about said zones of reduced thickness to lie in juxtaposed relationship to said rib to open the bore and with fluid flow in a reverse direction from said second section to said first section the circular planform defined by the wings remain fully within the second section as the one-piece valve element remains captively secured within the second section.

2. A non-return valve as claimed in claim 1 wherein said shoulder comprises a tapered transition between said first and second sections of the through bore and the cross-sectional area of said first section of the bore being less than the cross-sectional area of said second section of the bore.

3. A non-return valve as claimed in claim 1 wherein the thickness of said wings of said valve element tapers from a minimum at said zones of reduced thickness to a maximum at said periphery of said wings.

* * * * *